Feb. 11, 1964 W. V. COATE 3,120,863
TRACTION DEVICE
Filed Nov. 28, 1962

INVENTOR.
WILLIAM V. COATE
BY Kimmel & Crowell
ATTORNEYS.

United States Patent Office 3,120,863
Patented Feb. 11, 1964

3,120,863
TRACTION DEVICE
William V. Coate, 408 Sweitzer St., Greenville, Ohio
Filed Nov. 28, 1962, Ser. No. 240,668
2 Claims. (Cl. 152—210)

This invention relates to a traction device, and more particularly to such a device adapted to be inserted or embedded in the tread of a vehicle tire to increase traction and prevent skidding on icy or snow covered roads.

A primary object of the invention is the provision of a traction device of this character which is adapted to be inserted into a vehicle tire at the point where the tread is thickest, that is, adjacent the side edges of the tread on the bottom thereof, and which includes a threaded member having a conical head, the device being inserted at an angle relative to the path of travel of the vehicle tire so that one of the relatively sharp edges of the head contacts the road and cuts through any film of ice or snow thereon to enable the vehicle tire firmly to grip the road and afford improved traction and reduce the possibility of skidding.

An additional object of the invention is the provision of such a device having a conical recess in the head thereof, which reduces the direct contact with the road surface, and which also provides added traction, there being a bore provided intersecting the recess to prevent the accumulation of snow and ice in the recess, and to provide a cooling effect.

A further object of the invention is the provision of a device of this character which, due to the angular inclination of insertion thereof, will partially embed itself in the tire as the tire contacts the road surface leaving only the sharp edge of the conical head partially exposed, to provide an increased anti-skid efficiency.

A further object of the invention is the provision of such a device which, when so embedded angularly of the sides of the tread of a tire, will conform to lateral movement of the tire to move the edge angularly relative to the direction of the lateral movement or skid, and thus provide increased tendency to resist skidding.

A still further object of the invention is the provision of such a device which is sturdy and durable in construction, reliable and efficient in operation, and relatively simple and inexpensive to manufacture and utilize.

Other objects reside in the arrangement of parts, features of construction, and combination of elements, all as will be more fully pointed out hereinafter and disclosed in the accompanying drawing wherein there is shown a preferred embodiment of this inventive concept.

In the drawing.

Similar reference characters refer to similar parts throughout the several views of the drawing.

Figures 1, 2:
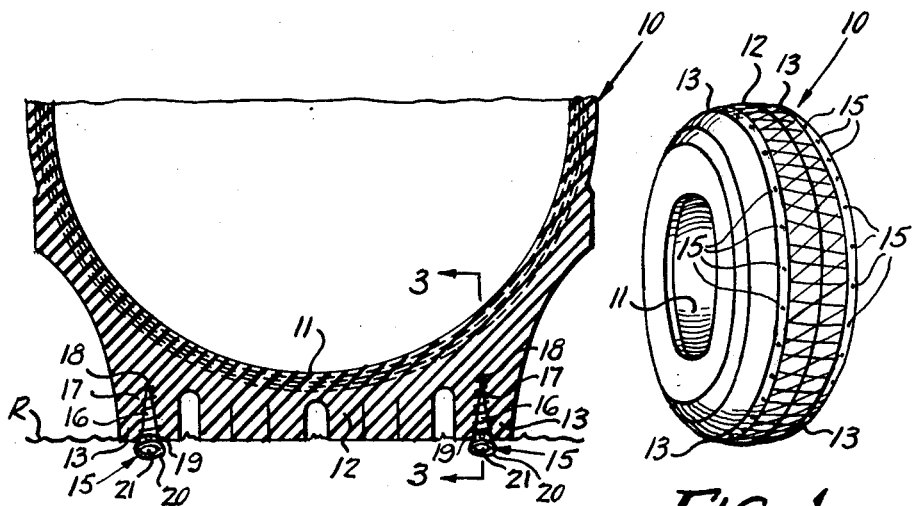
FIGURE 1 is a perspective view of a vehicle tire showing the tread thereof, together with a plurality of the devices comprising an element of the instant invention inserted therein.
FIGURE 2 is an enlarged fragmentary radial section taken through a tire rim showing the tread with the devices of the instant invention positioned therein.

Having reference now to the drawing, there is generally indicated at 10 a vehicle tire which is provided with the conventional casing 11 and tread 12, the tread being thickest at the portions 13 adjacent the side edges of the tire.

Adapted to be inserted in the portions 13 of the tread 12 are a plurality of individual anti-skid traction devices generally indicated at 15. Each traction device 15 includes a tapered shank 16 having a helical screw thread 17 extending thereabout and terminating in a sharp point 18. At the opposite end of tapered shank 16 is a conical head 19, which is provided with a sharp annular outer rim or edge 20. Formed interiorly of the head is a conical recess 21, at the bottom of which is a bore 22 which extends at an angle through the side wall of head 19 from the interior of recess 21 at a point adjacent the bottom thereof sloping angularly and downwardly to a point 22 immediately at the juncture of conical head 19 with the thicker portion of tapered shank 16. The conical recess provides a means for increasing the traction of the device by permitting the rubber of the tire firmly to grasp the head when the device contacts the ground, while the bore 22 permits drainage of any accumulated snow or ice which would otherwise accumulate in recess 21, as well as providing a cooling effect.

Figure 4:
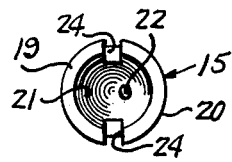
FIGURE 4 is a top plan view of one of the screw threaded traction members disassociated from the tire.
Figure 5:
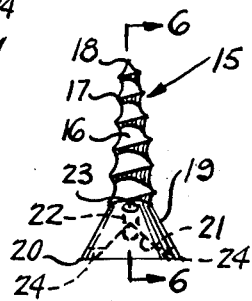
FIGURE 5 is a side elevational view of the device of FIGURE 4, certain concealed portions thereof being indicated in dotted lines.
Figure 6:
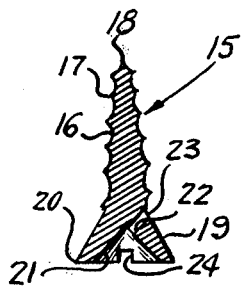
FIGURE 6 is a sectional view taken substantially along the line 6—6 of FIGURE 5 as viewed in the direction indicated by the arrows.

As best shown in FIGURE 4, diametrically opposed grooves 24 are formed in the rim or upper portion of head 19, and provide spaces for the reception of a screwdriver to be employed in inserting the traction devices into a tire.

Figure 3:
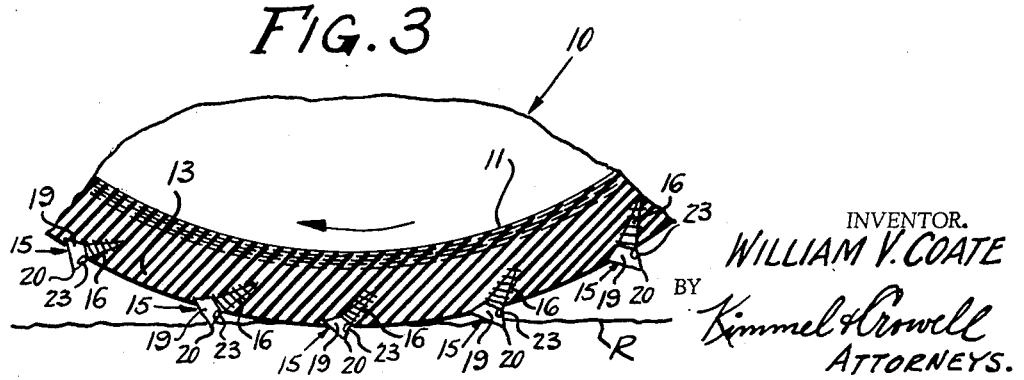
FIGURE 3 is a sectional view taken substantially along the line 3—3 of FIGURE 2 as viewed in the direction indicated by the arrows.

As best shown in FIGURE 3, each of the screws or traction devices is inserted into the thickest portion 13 of tread 12 as indicated at an acute angle to the radius of the wheel, the angle preferably being approximately 40°. All of the traction devices preferably are inclined in the same direction, although opposite inclination may be employed, if desired. As illustrated, the sharp annular rim 20 engages through any film of ice covering the road surface R, but the head 19 is simultaneously forced inwardly into the thick portion 13 of tread 12, which forms a cushion therefor, such embedding further precluding the lateral slippage of the tire. Each head 19 thus serves as an individual anti-skid device, and by virtue of the two annular rows of inclined anti-skid members, slippage either laterally or in the direction of travel of the vehicle is reduced to a comparative minimum.

From the foregoing it will now be seen that there is herein provided an improved traction device for vehicle tires which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In combination with a vehicle tire having a tread with relatively thick edge portions, a plurality of traction devices each comprised of a screw having a tapered conical head and a conical recess in said head providing a thin tapered wall with a sharp tapered edge, said device being inserted at an acute angle relative to the path of travel of the tire into the thick edge portions of the tread at spaced intervals about the periphery of the tire with the sharp tapered edge of the wall formed by the recess and the conical head projecting from the tread on an acute angle to engage the road surface to cut through ice thereon and prevent skids.

2. The combination of claim 1 wherein said conical head is provided with a bore extending through the wall of the head and intersecting said recess, said bore preventing the accumulation of ice and snow in said recess.

References Cited in the file of this patent

UNITED STATES PATENTS

| | | |
|---|---|---|
| 1,518,119 | Rees | Dec. 2, 1924 |
| 2,458,391 | Lavietes | Jan. 4, 1949 |

FOREIGN PATENTS

| | | |
|---|---|---|
| 12,231 | Great Britain | 1911 |